Dec. 15, 1936.  O. DAHL ET AL  2,064,296
UPWARDLY SWELLING FISHING NET
Filed Oct. 25, 1934

INVENTORS:
OSCAR DAHL
WILLIAM FORSYTH BLACK
BY: Francis E. Boyce
ATTORNEY

Patented Dec. 15, 1936

2,064,296

UNITED STATES PATENT OFFICE 2,064,296

UPWARDLY SWELLING FISHING NET

Oscar Dahl and William Forsyth Black, La Rochelle, France

Application October 25, 1934, Serial No. 749,893
In France March 23, 1934

4 Claims. (Cl. 43—9)

The invention relates to fishing nets adapted to swell upwardly, that is to nets in which the head-rope and the upper sheet have such size that they are raised by the floats which are attached thereto.

It has already been proposed to eliminate the belly of fishing nets, in order to obviate the frequent damages and the various other drawbacks which are due to the presence of a belly and of a long ground rope stretched across the direction of trawl (namely the impossibility of fishing upon irregular grounds, where the fish are generally abundant). But it has been found that the elimination of the belly, at least in upwardly swelling nets, causes the ground rope of the net to lose contact with the sea bottom, whereby fishing becomes impossible. The practical remedies previously proposed with a view to obviating this latter drawback (shortening of the rear pocket traction cables, provision of an upper traction member) afforded satisfactory results, but required a very accurate adjustment in assembling the net parts, and the adjustment must be varied according to the shape and size of the various nets to be manufactured; in fact, these arrangements often required the provision of a small-sized belly.

The present invention has for its object to provide a new arrangement which permits of remedying this drawback; another object is to improve the efficiency of the fishing operation, to materially simplify the adjustment and construction of the net, and to permit the immediate application of the invention to all nets without prior experiments or calculation. Further objects and advantages of the invention will be set forth hereafter.

According to the invention, the net is deprived of belly and comprises to the rear an upper and a lower portion which are independent of each other except where they join with the front parts of the net, the top sheet of the upper portion being adapted to operate substantially at the level of the apex of the head rope, while the bottom sheet of the lower portion is adapted to keep the rear part of the ground rope in contact with the sea bottom.

The invention will be better understood with reference to the accompanying drawing, in which.

Figure 1:
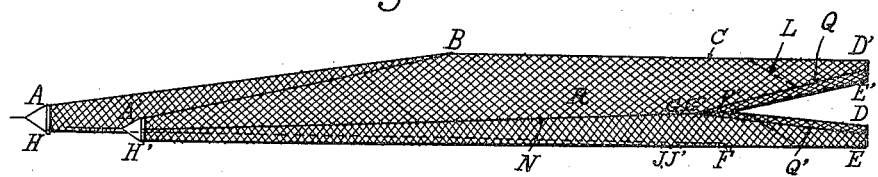
Fig. 1 is a perspective view of a net according to the invention, with stretched ground rope.

Referring to Fig. 1, which shows a bellyless upwardly swelling net of the V. D. type, ABA' denotes the head rope provided with floats, BC the covering sheet, CD the upper part of the rear section and of the rear pocket, EF the lower part of the rear section and of the rear pocket, and HFH' the ground rope which borders the lower wings and the lower part of the rear pocket.

According to the present invention, the net is divided toward the rear (Figs. 1 and 2) into two superposed and independent portions, a lower portion GG'DEJJ' and an upper portion C'D'E'GG'. Each of these portions ends in a rear pocket. The upper portion C'D'E'GG' of the net may be considered as a means for keeping the ground rope against the sea bottom; besides said pocket is arranged after the manner of an actual small net, i. e. the fish which enter the rear pocket are retained therein by means of a screen L (Fig. 1).

From another point of view, the net according to the invention may be considered as deriving from a conventional net in which the rear pocket has a tendency to float above the sea bottom by the addition of a lower net portion, this lower net portion ensuring the contact of the ground rope HF'H' with the sea bottom.

Due to this arrangement, the covering sheet BC'D' of the net has a complete freedom to assume its normal horizontal position, without having any tendency to raise the lower part of the net, whose small ground rope JFJ' rubs upon the ground and causes the fish to remain within the net. The two rear pockets are wholly independent of each other, (except where they join with the front parts of the net) whereby the upper rear pocket may freely float without raising the lower pocket.

In a net thus constructed, the bands of netting located in the region C'GG'JJ' will obviously be given a sufficient extent in order that the point C' should lie substantially as the same level as the apex B of the head rope, while securing the full opening of the meshes.

In the embodiment of Fig. 1, the net is bordered at the lower part by a stretched ground rope HJFJ'H', and the wings are fitted with usual danlenos AH,A'H' or with cones. Such a net is particularly suited for fishing flat fish upon smooth grounds, when the ground rope has to plough up the ground.

Figure 2:
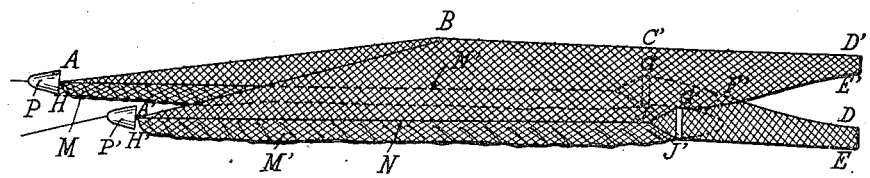
Fig. 2 is a similar view of a net according to the invention, with free ground rope.
Figure 3:
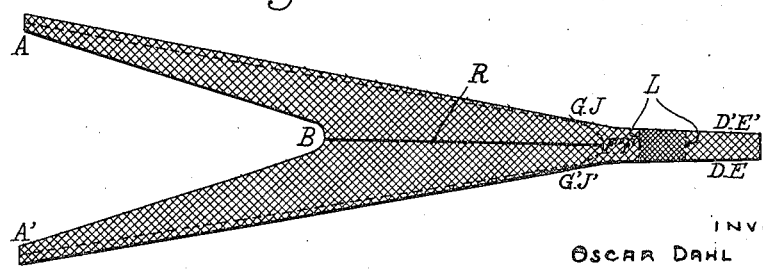
Fig. 3 is a plan view corresponding to Fig. 1 or to Fig. 2.

In the embodiment of Fig. 2, the net is bordered at the lower part by a free ground rope HJ,H'J', mounted along the edges of bands of netting MM', forming curtains, the small ground rope JFJ' of the rear pocket alone being stretched. Such a net is suited for fishing on rocky grounds.

The seam between the two portions of the net is provided by means of a cable GFG' forming the ground rope of the upper portion and the head rope of the lower portion. Said cable will preferably be connected to cables N,N' arranged either as side cables simply serving to assemble the upper and lower parts of the net, or as traction cables adapted to transmit the traction force to the rear pockets of the net. This latter case if the one shown in Fig. 2, where the curtains MM' are suspended from the traction cables NN', held above the ground by danlenos GJ,G'J' or other rigid members at the mouth of the lower pocket, and by cones PP' mounted at the ends of the wings.

If need be, the back may be provided with a middle upper traction member R.

If desired, the traction cables or side cables NN' may be bifurcated so as to form branch cables QQ' along the two superposed portions of the net.

Beside the advantages formerly indicated (elimination of the belly, simplicity and economy of construction), the duplication of the net to the rear into two superposed and distinct portions permits of getting the fish in a better condition, the round fish which swim above the bottom entering mainly the upper rear pocket, whereas the lower pocket contains almost exclusively flat and heavy fish and detritus; it also facilitates the escape of the small fish and secures restocking of the fishing resources; it further reduces the resistance to trawl, due to the natural inclination of the net sheets with respect of the direction of trawl.

It will also be noted that the covering sheet BC'D' is completely relieved from the traction of the lower rear pocket, charged with very heavy detritus. This facilitates its swelling, the opening of its meshes and permits of manufacturing same with lighter yarn and reduces the resistance to trawl.

Having now described our invention what we claim as new and desire to secure by Letters Patent is:

1. A bellyless upwardly swelling net comprising a covering sheet and separate upper and lower rear portions, connected with said covering sheet and having no common wall throughout substantially their entire length, each ending in a rear pocket.

2. A bellyless upwardly swelling net comprising a covering sheet, a head rope along the front edge of said covering sheet, separate upper and lower rear net portions, connected with said covering sheet and having no common wall throughout substantially their entire length, and a ground rope along the front lower edge of the lower rear net portion, the top sheet of the upper rear net portion being positioned to operate substantially at the level of the apex of the head rope, and the bottom sheet of the lower rear net portion being positioned to keep said ground rope in contact with the sea bottom.

3. A bellyless swelling net comprising a covering sheet, a head rope along the front edge of said covering sheet, separate upper and lower rear net portions connected with said covering sheet and having no common wall throughout substantially their entire length, and a ground rope along the front lower edge of the lower rear net portion, the top sheet of the upper rear net portion being positioned to operate substantially at the level of the apex of the head rope, and the bottom sheet of the lower rear net portion being positioned to keep said ground rope in contact with the sea bottom, a connecting cable forming the seam between said portions, and traction cables attached to said connecting cable and extending to the front ends of said covering sheet.

4. A net as claimed in claim 3, wherein said traction cables are bifurcated to the rear, the rear branches of said cables running along the sides of said rear net portions, respectively.

OSCAR DAHL.
WILLIAM FORSYTH BLACK.